United States Patent
von Collani et al.

(10) Patent No.: US 9,637,123 B2
(45) Date of Patent: May 2, 2017

(54) METHOD FOR OPERATING A SELF-PROPELLED MOBILE PLATFORM

(71) Applicant: Robert Bosch GmbH, Stuttgart (DE)

(72) Inventors: Yorck von Collani, Beilstein (DE); Markus Ferch, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/645,900

(22) Filed: Mar. 12, 2015

(65) Prior Publication Data

US 2015/0274165 A1 Oct. 1, 2015

(30) Foreign Application Priority Data

Mar. 31, 2014 (DE) .................. 10 2014 206 086

(51) Int. Cl.
*G06F 7/70* (2006.01)
*B60W 30/14* (2006.01)
*B60T 7/22* (2006.01)

(52) U.S. Cl.
CPC .............. *B60W 30/143* (2013.01); *B60T 7/22* (2013.01); *B60T 2201/022* (2013.01); *B60W 2300/40* (2013.01)

(58) Field of Classification Search
None
See application file for complete search history.

(56) References Cited

U.S. PATENT DOCUMENTS

| | | | |
|---|---|---|---|
| 6,683,969 B1 * | 1/2004 | Nishigaki | B60K 31/0008 180/167 |
| 2007/0132563 A1 * | 6/2007 | Balbale | B60Q 9/004 340/435 |
| 2008/0162027 A1 * | 7/2008 | Murphy | B60W 50/14 701/117 |
| 2009/0292393 A1 | 11/2009 | Casey et al. | |
| 2012/0185095 A1 | 7/2012 | Rosenstein et al. | |
| 2012/0316725 A1 * | 12/2012 | Trepagnier | G01S 17/023 701/26 |

FOREIGN PATENT DOCUMENTS

| | | |
|---|---|---|
| DE | 11 2011 104 645 T5 | 10/2013 |
| EP | 2 120 122 A1 | 11/2009 |
| WO | 93/03399 A1 | 2/1993 |

\* cited by examiner

*Primary Examiner* — Adam Alharbi
(74) *Attorney, Agent, or Firm* — Maginot, Moore & Beck LLP

(57) ABSTRACT

A method for operating a self-propelled mobile platform includes reducing a speed of the mobile platform as a function of a distance between the mobile platform and obstacles situated along a travel route of the mobile platform. The mobile platform includes at least one first sensor configured to detect obstacles in surroundings of the mobile platform.

9 Claims, 3 Drawing Sheets

METHOD FOR OPERATING A SELF-PROPELLED MOBILE PLATFORM

This application claims priority under 35 U.S.C. §119 to patent application no. DE 10 2014 206 086.9 filed on Mar. 31, 2014 in Germany, the disclosure of which is incorporated herein by reference in its entirety.

The present disclosure relates to a method for operating a self-propelled mobile platform including at least one sensor for detecting obstacles in the surroundings of the mobile platform. Furthermore, the present disclosure relates to a self-propelled mobile platform and a computer program, a machine-readable storage medium including a computer program, and an electronic control device, which are suitable for carrying out the method according to the present disclosure.

BACKGROUND

Autonomously driven, self-propelled mobile platforms are used in various sectors, for example, as industrial trucks in industrial manufacturing or storage, or as transport robots in hospitals, nursing homes, or the like (automated guided vehicle—AGV). When operating self-propelled mobile platforms, various safety aspects must be considered. The safety concept of autonomously driven platforms should be designed in such a way that these vehicles are not able to collide with obstacles and other driven platforms, or if at all, only at low speed. In this context, a speed of the mobile platform below 0.3 m/s is considered to be non-critical. Furthermore, the safety concept must ensure that collisions with people are safely avoided. In this context as well, a speed below 0.3 m/s is considered to be non-critical.

A suitable sensor system is used for a safe operation of the mobile platforms, so that obstacles may be detected in a timely manner and the mobile platform is able to respond appropriately. For example, distance sensors are used which are able to detect frontal obstacles based on wave transit time measurements. It is thus possible to plan and adapt the travel route of the mobile platform accordingly and to drive around obstacles, including people. The higher the travel speed of the mobile platform, the earlier an imminent collision must be detected in order to be able to brake and/or reroute the vehicle appropriately.

Self-propelled mobile platforms are normally equipped with a personal protection sensor system, in which people who are situated in the travel route may be detected with the aid of sensors working in particular in a contact-free manner. Based on such safety sensors, a safety zone may be defined. As soon as a person is detectable in this safety zone, this may be signaled to the drive of the mobile platform via an interface, so that the mobile platform is able to stop or travel more slowly.

The limitation of the field of vision of the aforementioned safety sensors when entering an intersection area is especially problematic for safe operation. The corridor walls impede the "vision" of the distance sensors toward possibly approaching obstacles (people) which to move within a corridor opening into the intersection. Therefore, the maximum speed is often reduced before entering an intersection area, and is again increased after passing through the intersection. In order for the mobile platform to be able to detect the intersection area at all, either an external indication of the intersection must be present via corresponding markings, for example, via RFID (radio frequency identification) markings or visual marking, or the detection of the intersection must be implemented within the mobile platform via internal measures, for example, via a continuous localization of the mobile platform with respect to data relating to the surroundings. Both solutions are relatively complex, since additional infrastructure measures are required which, being safety-related measures, must also be checked and monitored.

The German patent application DE 11 2011 104 645 T5 describes a mobile robot which may be used as a driverless transport vehicle, this robot being equipped with a dead-zone sensor and in particular with a rotating imaging sensor. With the aid of this sensor, imaging signals may be recorded along the direction of travel in order to be able to detect the location of an object in the surroundings of the robot and maneuver the robot appropriately. The U.S. patent application US 2009/0292393 A1 describes a cleaning robot. In order to be able to perform cleaning in the wall area, the cleaning robot has a wall-following mode, a wall being detected using an appropriate sensor system and the robot being guided along the wall. The European patent application EP 2 120 122 A1 also describes a mobile cleaning robot which is equipped with proximity sensors for detecting obstacles. As soon as an obstacle is thereby detected, the speed of the robot may be reduced in response.

SUMMARY

The method according to the present disclosure is provided for operating a self-propelled mobile platform which includes at least one sensor for detecting obstacles in the surroundings of the mobile platform. In particular, the sensor is a distance sensor which, for example, is based on the principle of a transit time measurement of transmitted measurement pulses, for example, electromagnetic waves or acoustic waves. According to the present disclosure, a distance measurement is performed between the mobile platform and obstacles which are situated along the travel route of the mobile platform. The speed and in particular the maximum speed of the mobile platform is reduced as a function of this distance. In particular, the shorter the distance is, the greater the reduction of the speed. The present disclosure thus assumes that it is generally more advantageous to maintain a greater distance from lateral obstacles, in particular from the side walls of a corridor. If the distance from a corridor wall or other vision-limiting parts of a building or objects in the longitudinal direction of the travel route is too short, a particular visual limitation results if the mobile platform enters an intersection area. Here, "visual limitation" may be understood to mean that the field of vision of a safety sensor of the mobile platform, which is oriented toward frontal obstacles and which is used for avoiding collision, is limited. The closer the mobile platform is situated to a part of a building or another object and the more that the field of vision of this sensor system is limited as a result, the more sharply the speed is reduced according to the present disclosure. In this way, hazardous situations may be mitigated, in particular in intersection areas. Collisions in an intersection area may be avoided, since the reduced speed provides the mobile platform with the option of stopping in a timely manner or performing an evasive maneuver. On the other hand, the reduced speed of the mobile platform allows the approaching object, in particular a person, to get out of the way in a timely manner. The method according to the present disclosure is also advantageous regardless of the particular situation at intersections. When traveling in a corridor (without an intersection), it provides advantages if the speed is reduced if the distance from a wall or another lateral object is short. With the aid of the measure according to the present disclosure, the (maximum) speed is reduced at bottlenecks. Bottlenecks are characterized by the distance from lateral obstacles being reduced. According to the present disclosure, the speed is reduced in these situations. If, for example, the corridor is relatively narrow, the speed is reduced or the maximum speed is reduced, so that in the event of the mobile platform encountering people, these people have sufficient time to leave the bottleneck or to avoid the mobile platform in an appropriate manner.

Overall, the method according to the present disclosure allows an operation of the mobile platform in which the speed is reduced or adapted in potentially hazardous situations without additional infrastructure measures being required. Outside such potentially hazardous situations, i.e., in particular outside intersection areas and outside bottlenecks, the mobile platform is able to move at an unlimited maximum speed, thus ensuring cost-effectiveness. This omission of additional infrastructure measures is also highly advantageous with regard to safety checks. The reduction of the speed constitutes a safety-related measure which must therefore satisfy relevant safety standards. Since neither complex algorithms nor other additional infrastructure measures are required, it is possible to check this function without a great deal of effort.

Independently of the method according to the present disclosure, other safety-related measures may of course be used, in particular, additional protective distance sensors, or a visual or audible warning signaling by the mobile platform, or measures for localizing the platform, or other external infrastructure measures.

In principle, it is possible that the protective distance sensor provided in conventional mobile platforms or the provided protective distance sensors which are used in particular for avoiding collisions with frontal obstacles are also used in the context of the present disclosure, i.e., for distance measurement with regard to obstacles situated along the travel route. In one preferred specific embodiment of the method according to the present disclosure, however, one or multiple separate sensors are used for this purpose, which are used for the purposes of the method according to the present disclosure independently of the other protective distance sensors of the mobile platform which are possibly present. These separate sensors may be appropriately positioned on the mobile platform depending on the design and the transmission and reception directions of the sensors. In particular, these sensors may be situated in the lateral area of the mobile platform. Here, it is important that the sensors are able to carry out a measurement of distance from objects transversely to the direction of travel, i.e., from laterally emerging obstacles or from obstacles situated along the travel route. It may be provided that these separate sensors and the other protective distance sensors have basically the same design. However, different types of sensors may also be used for this purpose.

In one preferred embodiment of the method according to the present disclosure, the signals for detecting obstacles situated along the travel route are evaluated and/or filtered in such a way that a minimum size and/or a minimum length of the obstacles may be detected. The reduction of the maximum speed of the mobile platform is triggered only if this minimum size and/or minimum length is reached. This evaluation (smoothing) of the signals prevents narrow objects, for example, a column or a door frame, from unnecessarily forcing a deceleration.

In one preferred specific embodiment of the method according to the present disclosure, the direction of travel of the mobile platform is taken into account when evaluating the signals for detecting the lateral obstacle. Thus, it is not rigidly assumed that the direction of travel is always forward but rather the steering angle and therefore the actual direction of travel are taken into account. Depending on the direction of travel, the measurement of distance from lateral obstacles is then carried out in a different direction. Thus, for example, if the mobile platform travels around a curve, the measurement of distance from the side corridor wall is correspondingly adapted.

Preferably, the travel speeds of the mobile platform are configured according to the use or the field of application of the mobile platform. Thus, different maximum speeds may be provided as a function of different application environments. For example, in a hospital, where it may be expected that a large number of people are encountered, the overall speed should be somewhat slower than, for example, in a warehouse. When configuring the speeds, suitable maximum speeds should be provided for various situations, in particular for normal operation on the one hand, and for operation in potentially hazardous situations on the other hand, which are characterized by a narrow clearance from lateral obstacles.

A self-propelled mobile platform which is able to be operated according to the method according to the present disclosure must include at least one sensor which is suitable for detecting obstacles situated along the travel route, i.e., lateral obstacles with respect to the direction of travel of the mobile platform. Here, the maximum speed of the mobile platform is reduced if the distance from lateral obstacles falls below a minimum distance. The minimum distance may, for example, be 20 cm for an application in hospitals. It is possible to reduce the speed steplessly as a function of the distance from the wall. In other embodiments, the speed may be reduced in predefined steps. For example, a stepwise reduction of the speed at particular threshold values of the distance (for example, 20 cm, 15 cm, 10 cm) may be provided. The threshold values may be predefined equidistantly or non-equidistantly. The same applies to each provided speed reduction.

The method according to the present disclosure mitigates hazardous situations at bottlenecks or when approaching an intersection if the mobile platform is situated relatively close to lateral objects which limit vision. Preferably, in addition to the sensor(s) for detecting lateral obstacles, the mobile platform includes at least one conventional sensor for detecting frontal obstacles, which is used in a manner known per se as a protective sensor for avoiding collisions with frontal objects, viewed in the direction of travel. The sensor(s) is/are advantageously connected directly to the drive of the mobile platform, so that if objects or obstacles are detected within definable protection areas, the speed of the mobile platform may be immediately adapted, i.e., reduced or set to zero.

The mobile platform may in particular be a transport robot as may be used, for example, in hospitals or nursing homes, and which, for example, may be equipped with additional service functions; and/or an industrial truck as may be used, for example, at industrial storage or manufacturing sites. The mobile platform may also, for example, be a robot which is not, or is not primarily, designed for transport purposes, and which, for example, has no storage surface for objects. For example, it may merely be a service robot. However, other applications of the method according to the present disclosure or the correspondingly operated mobile platform are also possible.

Furthermore, the present disclosure includes a computer program or a control program for operating a mobile platform which carries out each step of the method according to the present disclosure in the described manner. In addition, the present disclosure includes a machine-readable storage medium on which this program is stored, and finally an electronic storage device which is configured to carry out the steps of the method according to the present disclosure. The control program may, for example, readily be integrated into existing mobile platforms, so that the advantages of the method according to the present disclosure may also be used in existing systems.

Additional features and advantages of the present disclosure result from the following description of exemplary embodiments in connection with the drawings. Each of the individual features may be implemented individually or in combination.

DETAILED DESCRIPTION

Figure 1:
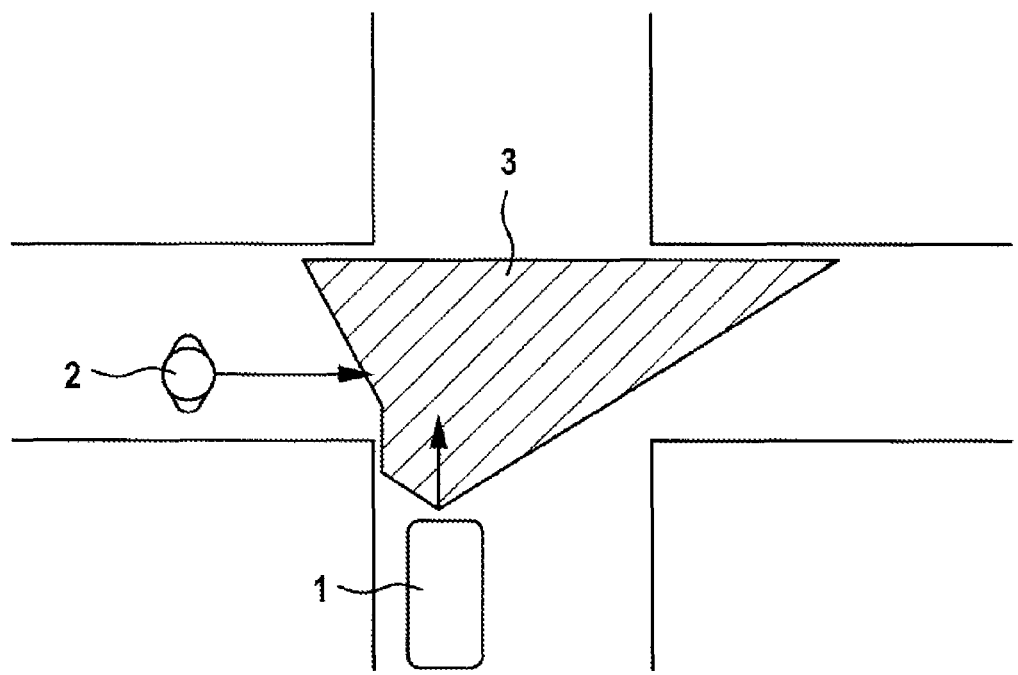
FIG. 1 shows a schematic representation of a potentially hazardous situation in an intersection area.

FIG. 1 illustrates a potentially hazardous situation in an intersection area, which may be overcome without actual hazards, with the aid of the method according to the present disclosure. The mobile platform 1 moves in an autonomous manner through a corridor system. In this case, it travels in the direction of the arrow into an intersection area. Simultaneously, a person 2 moves into this intersection area, the person 2 moving in a corridor which merges from the left with respect to the direction of travel of the mobile platform 1. The mobile platform 1 is equipped in the usual manner with a frontally oriented protective sensor. This protective sensor or safety sensor is, for example, a laser scanner or an ultrasonic sensor which scans the area in the direction of travel. Here, a safety zone is definable. If an obstacle, for example, a physical object or a person, is detected in this safety zone, this is detected by the mobile platform 1, and the mobile platform is able to respond accordingly. The mobile platform 1 may in particular reduce its speed or stop. In addition, an evasive manoeuvre may be performed. In FIG. 1, the "field of vision" of the safety sensor is depicted by 3. This field of vision simultaneously represents the safety zone. In this situation, it is problematic that the field of vision 3 of the safety sensor is limited by the corridor wall situated on the left next to the mobile platform 1. The corridor wall limits the "vision" of the mobile platform 1 in such a way that the person 2 is not "seen," although he/she is already situated in physical proximity to the mobile platform 1. Above a certain speed of the mobile platform 1, it would no longer be possible in this situation for the mobile platform 1 to slow down in a timely manner. This problem is conventionally solved by the mobile platform slowing down in a timely manner in all intersection situations. For this purpose, various additional infrastructure measures are conventionally required. For example, external identifiers of an intersection are used before an intersection, for example, via RFID, which may be detected via a corresponding sensor system of the mobile platform. Alternatively, the autonomous vehicle may detect an intersection, for example, based on its own position within a map. These measures are all relatively complex. According to the present disclosure, this situation is resolved by the maximum speed of the mobile platform being reduced as a function of a distance from the vision-limiting parts of a building or objects which are situated along the mobile platform, i.e., transversely to the direction of travel. The closer the mobile platform is situated laterally to a part of a building or another object, the more highly limited the field of vision of the sensor system is. According to the present disclosure, the maximum speed is therefore limited as a function of the distance of such lateral obstacles. As soon as the mobile platform enters the intersection, this measure according to the present disclosure no longer applies. However, as soon as the mobile platform is situated at the intersection, the vision of the safety sensor is no longer limited, so that the usual safety measures may then be used by means of the essentially frontally oriented safety sensor. The method according to the present disclosure generally assumes that it is generally more advantageous or safer to travel in the center of a corridor than near the wall. On the one hand, this applies to intersection situations in which vision at the intersection is limited by the proximity to the wall. On the other hand, this generally also applies to bottlenecks in which it is difficult for people to get out of the way due to the constricted space. The method according to the present disclosure may be implemented without additional infrastructure measures, which is advantageous in particular with regard to the checking of safety standards.

In a hospital, for example, a distance from the wall of 20 cm may be assumed to be a critical distance. According to the present disclosure, it may be provided that the maximum speed of a mobile platform is then limited to a maximum of 1 m/s, preferably to a maximum of 0.8 m/s. The specific design of the method according to the present disclosure, i.e., in particular the magnitude by which the speed is to be reduced, and the distance from the wall at which the speed is to be reduced, may primarily be made a function of the particular characteristics of the self-driving platform (for example, installation points of the sensors, standard maximum speed of the platform, maximum braking deceleration), and of the assumptions about people possibly appearing (for example, maximum speed, dimensions, distance from the wall). If a speed reduction is carried out according to the present disclosure in a hospital in the event of falling below, for example, 20 cm from the side corridor wall, the safety distance may nevertheless be greater with respect to frontal obstacles. The safety distance with respect to frontal obstacles may, for example, be chosen within a range from approximately 40 cm (for example, hospital) up to approximately 200 cm (for example, warehouse), as a function of the maximum speed and the braking capacity of the platform.

The method according to the present disclosure makes it possible for the self-propelled mobile platform, i.e., the autonomous vehicle, to be driven at a reduced maximum speed, for example, 0.3 m/s, in hazardous situations, and at a higher speed outside of such situations, even without an explicit intersection and bottleneck detection. The reduced maximum speed is set according to the present disclosure in the event of falling below a critical distance from lateral obstacles, wherein the critical distance may be, for example, 20 cm, depending on the type, use, and field of application of the mobile platform. In this way, it is possible to mitigate hazardous situations at bottlenecks or in intersection areas if the field of vision of the mobile platform is limited by a distance from the side wall which is too narrow.

Figure 2:
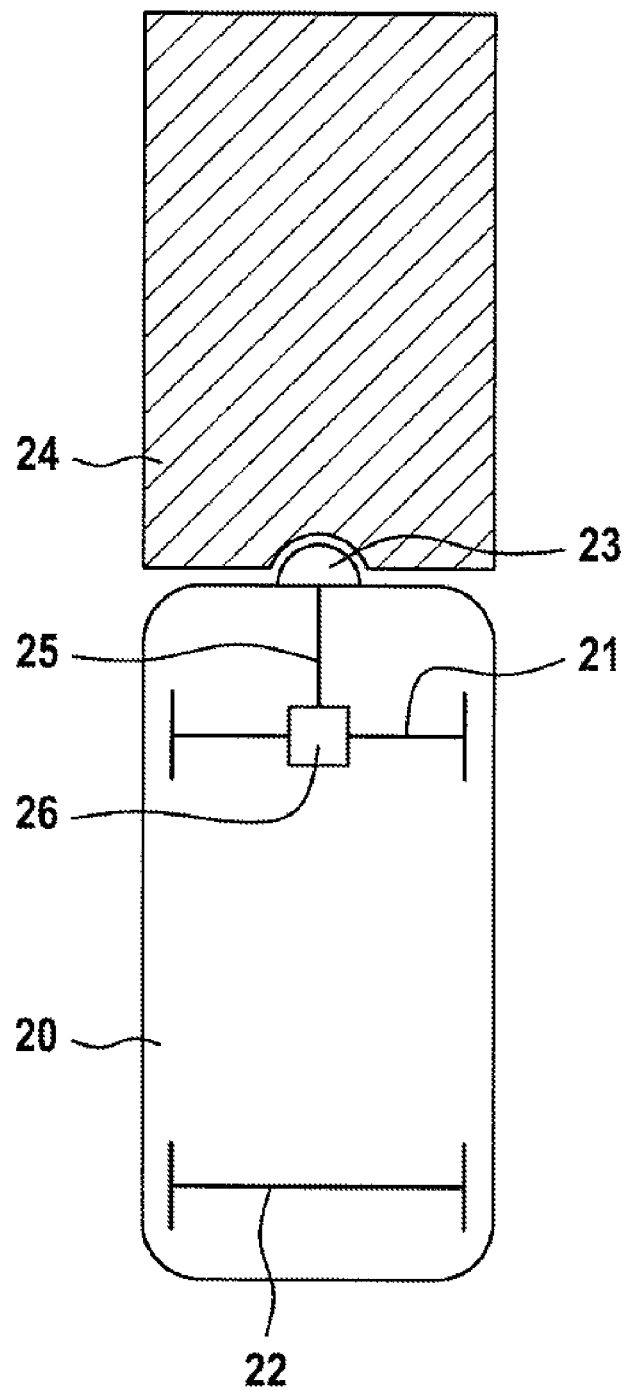
FIG. 2 shows a schematic representation of a conventional mobile platform including a frontally oriented protective sensor which is able to be operated according to the present disclosure.

FIG. 2 shows a typical mobile platform 20 having a front (drive) axle 21 and a rear (drive) axle 22. A distance sensor 23 is situated in the front area of the mobile platform, which is used for detecting obstacles and/or people in the travel route of the mobile platform 20 and is in particular approved as a safety sensor. This protective sensor 23 provides the option of defining a safety zone 24. As soon as an obstacle and, in particular a person, are detectable in this safety zone 24, this is signalled to the drive 26 of the mobile platform via an interface 25. The mobile platform 20 responds by decreasing the speed or by braking. According to the present disclosure, the mobile platform 20 is operated in such a way that the maximum allowable speed is made a function of the magnitude of the distance from objects which are transverse to the direction of travel, i.e., the magnitude of the distance from the lateral obstacles. If the mobile platform moves in a corridor, these lateral obstacles are in particular the walls of the corridor system. The mobile platform 20 is operated in such a way that the maximum speed is low if the mobile platform is situated near a wall. However, if the mobile platform is situated at a greater distance from the wall or the walls, for example, in the center of the corridor, the maximum allowable speed is higher. When the mobile platform 20 enters an intersection area, this provides the advantage that the mobile platform travels relatively slowly if it is situated near the wall of a corridor. Due to the proximity to the wall, it has a limited "field of vision" toward the intersection, as illustrated in FIG. 1. The reduced speed prevents an unforeseen collision from occurring at the intersection. As soon as the intersection has been reached, no object transverse to the direction of travel, i.e., no lateral obstacle at a short distance, is any longer detectable. However, in this situation, the field of vision of the sensor is no longer limited, so that the speed may be controlled according to the typical function of the safety sensor 23, depending on objects within the protective area 24. In bottlenecks, the distance from the lateral obstacles necessarily narrows, i.e., in particular from a side wall or from both side walls, so that here as well, hazardous situations are mitigated via the reduction of the maximum speed according to the present disclosure.

Figure 3:
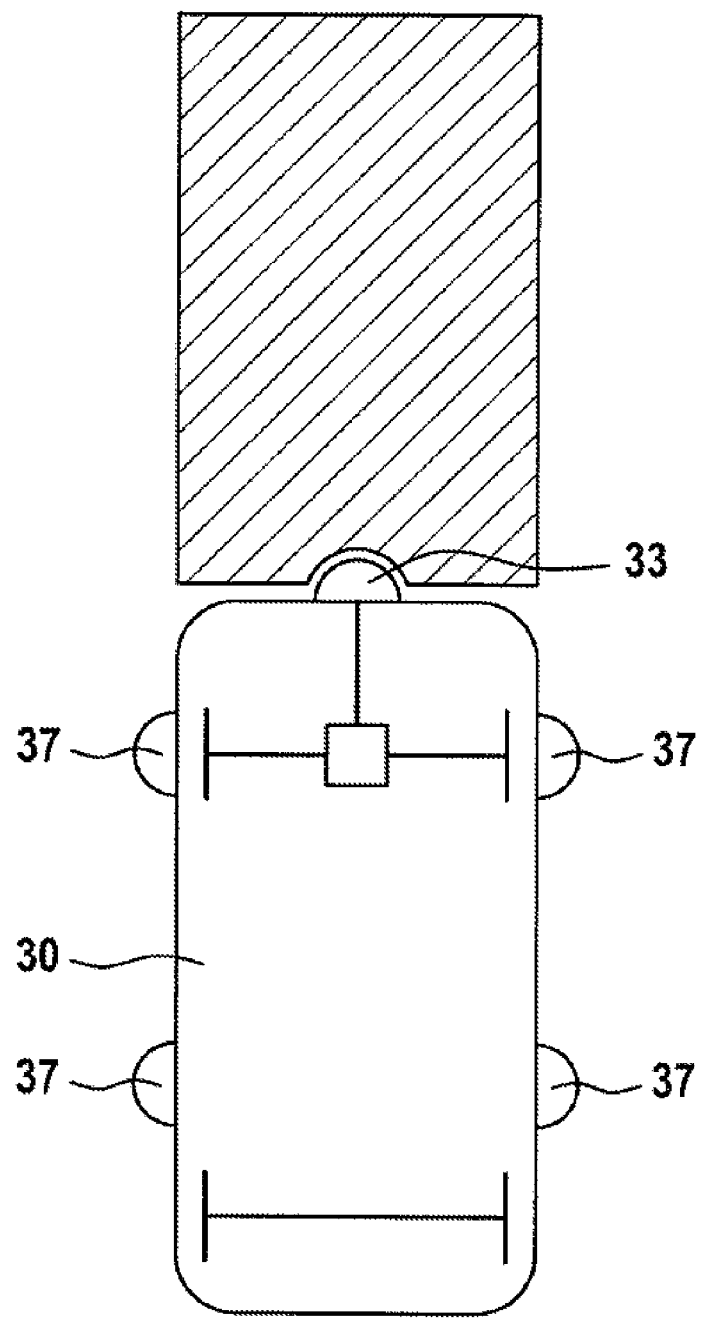
FIG. 3 shows a schematic representation of a mobile platform having laterally oriented distance sensors.

A prerequisite for the method according to the present disclosure is that the sensor(s) provided on the mobile unit is/are able to detect lateral objects, i.e., objects which are transverse to the direction of travel. This function may, for example, be achieved by a frontally situated sensor, for example, the sensor 23. However, separate sensors may also be provided for this purpose. FIG. 3 illustrates a mobile platform 30 including four laterally situated sensors 37 which are used for the purposes of the present disclosure. These may be the same type of sensors which are also used for the frontally situated protective sensor 33. However, other types of sensors may also be used for this purpose.

It is particularly advantageous if the laterally detectable obstacles are differentiated to the extent that in the case of very narrow or small lateral objects, no reduction of the speed takes place. This may be carried out via a corresponding filtering or smoothing of the detected signals. For example, the smoothing may be carried out at the last second via the formation of a median value or an average value of the wall distances. It is thus avoided, for example, that a laterally situated column, door frame, or the like causes a reduction in the maximum speed which is actually not required.

In the method according to the present disclosure, the actual direction of travel or the steering angle of the mobile platform may also be taken into account, this placing separate demands on the sensor system which measures the distance from lateral obstacles. Depending on the direction of travel, the measurement is oriented in a different direction.

In addition, the method according to the present disclosure may also be combined with devices which ensure that a minimum distance is maintained from lateral obstacles, in particular from lateral parts of a building. For example, in the case of falling below a critical distance from the wall, the travel route, if possible, may be corrected in such a way that the distance from the wall is increased. Furthermore, in the case of falling below a critical distance from lateral obstacles (for example, wall), the platform may be induced to stop or to slow down considerably. The position is then redetermined precisely. The platform may then continue traveling after a correction of the distance.

What is claimed is:

1. A method for operating a self-propelled mobile platform comprising:
   detecting a limitation of a field of view of at least one first sensor of the mobile platform, the limitation caused by a first obstacle;
   reducing a speed of the mobile platform as a function of the detected limitation by executing with an electronic control device a program stored in a memory;
   determining a reduction of speed based upon a distance between the mobile platform and the first obstacle; and
   establishing a maximum speed of the mobile platform as a function of the detected limitation by executing with the electronic control device the program stored in the memory.

2. The method according to claim 1, further comprising:
   providing at least one second sensor configured to detect the limitation of the field of view, wherein the at least one second sensor is used independently of a protective distance sensor of the mobile platform and the at least one first sensor includes the protective distance sensor.

3. The method according to claim 1, further comprising:
   performing at least one of evaluating, filtering, and smoothing of signals for detecting the limitation of the field of view with the electronic control device such that at least one of a minimum size and a minimum length of the first obstacle exists in order to trigger a reduction of a maximum speed of the mobile platform.

4. The method according to claim 3, wherein the evaluation of the signals is based at least in part on a direction of travel of the mobile platform.

5. The method according to claim 1, further comprising:
   configuring travel speed of the mobile platform based on use of the mobile platform.

6. A computer program stored in a memory which, when executed by a computing device causes an electronic control device configured to operate a self-propelled mobile platform to implement a method, the method comprising:
   detecting a limitation of a field of view of at least one first sensor of the mobile platform, the limitation resulting from a first obstacle;
   reducing a speed of the mobile platform as a function of the detected limitation; and
   determining a reduction of speed based upon a distance between the mobile platform and the first obstacle;
   establishing a maximum speed of the mobile platform as a function of the detected limitation by executing with the electronic control device the program stored in the memory.

7. The computer program according to claim 6, wherein the computer program is stored in a non-transitory computer-readable storage medium.

8. An electronic control device configured to perform the steps of a method for operating a self-propelled mobile platform, the method including:
   detecting a limitation of a field of view of at least one first sensor of the mobile platform, the limitation resulting from a first obstacle:
   reducing a speed of the mobile platform as a function of a distance between the mobile platform and the first obstacle, wherein the first obstacle is situated along a travel route of the mobile platform;
   determining a reduction of speed based upon a distance between the mobile platform and the first obstacle; and
   establishing a maximum speed of the mobile platform as a function of the detected limitation by executing with the electronic control device the program stored in the memory.

9. The computer program of claim 6, wherein detecting the limitation of the field of view comprises:
   detecting the limitation of the field of view using at least one second sensor, wherein the at least one second sensor is independent of a protective distance sensor of the mobile platform and the at least one first sensor includes the protective distance sensor.

* * * * *